United States Patent [19]

Pratt

[11] 4,421,337
[45] Dec. 20, 1983

[54] BICYCLE WITH RESILIENTLY YIELDABLE WHEEL SUPPORTS

[76] Inventor: Thomas A. Pratt, 7415 Baywind Dr., Cincinnati, Ohio 45242

[21] Appl. No.: 338,050

[22] Filed: Jan. 8, 1982

[51] Int. Cl.³ .................. B62K 25/08; B62K 25/10
[52] U.S. Cl. ................................. 280/277; 280/284
[58] Field of Search ............. 280/276, 277, 283, 284

[56] References Cited

U.S. PATENT DOCUMENTS

| Re. 12,437 | 1/1906 | Truffault | 280/276 |
|---|---|---|---|
| 90,723 | 6/1869 | Buell | 280/276 |
| 401,237 | 4/1889 | Woodward | 280/261 |
| 443,266 | 12/1890 | Bell | 280/277 |
| 564,319 | 7/1896 | Travis | 280/284 |
| 578,614 | 3/1897 | Travis | 280/284 |
| 708,202 | 9/1902 | Case | 280/284 |
| 902,920 | 11/1908 | Silva | 280/283 |
| 927,989 | 7/1909 | Meiser | 280/277 |
| 1,452,436 | 4/1923 | Pullin | 280/276 |
| 1,834,308 | 12/1931 | Harley | 280/276 |
| 2,446,731 | 8/1948 | Wheler | 280/284 |
| 2,485,484 | 10/1949 | Dean | 280/277 |
| 2,687,898 | 8/1954 | Schwinn | 280/276 |
| 3,964,765 | 6/1976 | Zenser | 280/276 |
| 3,982,770 | 9/1976 | Satoh et al. | 280/284 |
| 4,147,371 | 4/1979 | Morita et al. | 280/276 |
| 4,149,371 | 4/1979 | Spraker et al. | 60/39.07 |

FOREIGN PATENT DOCUMENTS

| 376759 | of 0000 | France | 280/277 |
|---|---|---|---|
| 559614 | 9/1923 | France | 280/284 |
| 443843 | 1/1949 | Italy | 280/276 |
| 539067 | 2/1956 | Italy | 280/277 |

Primary Examiner—John A. Pekar
Assistant Examiner—D. Lynn Fugate

[57] ABSTRACT

A bicycle and method of making same are provided wherein such bicycle has an improved system associated with its front and/or rear wheel which in each instance allows large and abrupt vertical movement of the wheel associated therewith while allowing the frame and bicycle rider to remain comparatively free of such movements. The bicycle may also be provided with an improved support structure for its pedal assembly.

27 Claims, 18 Drawing Figures

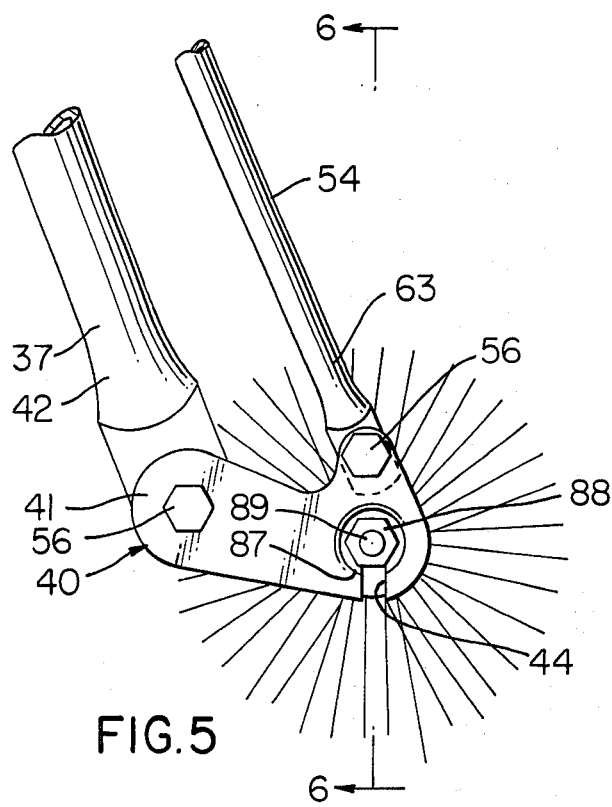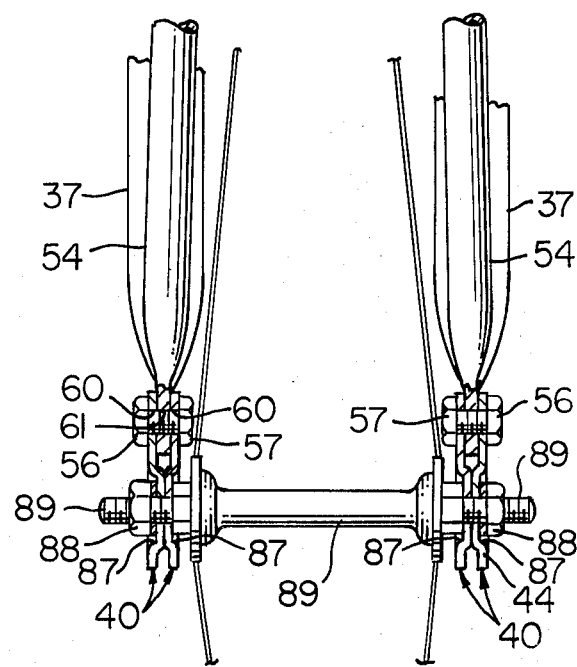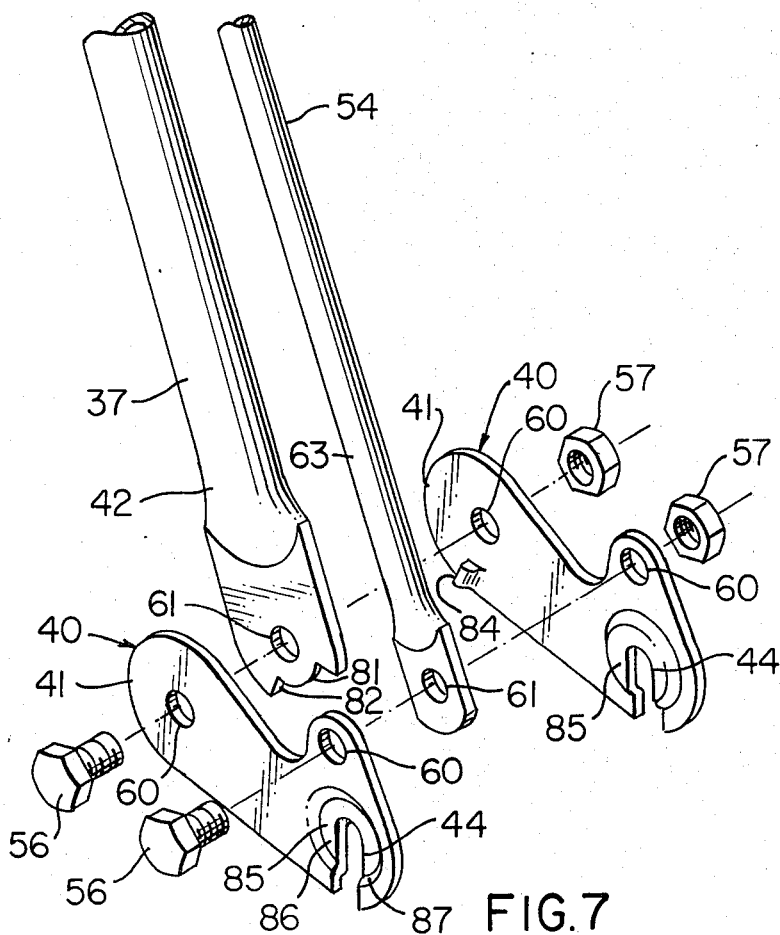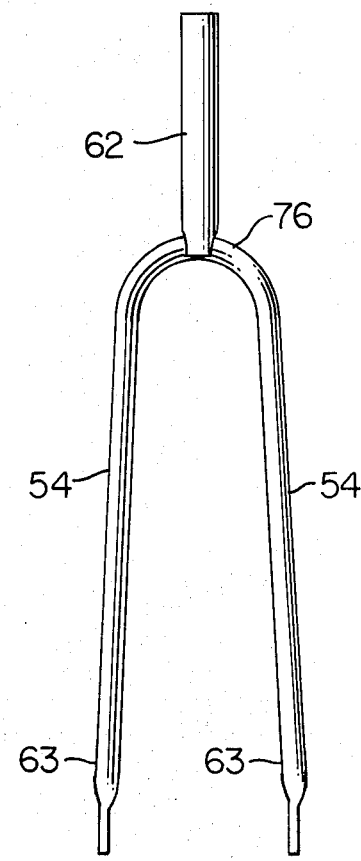

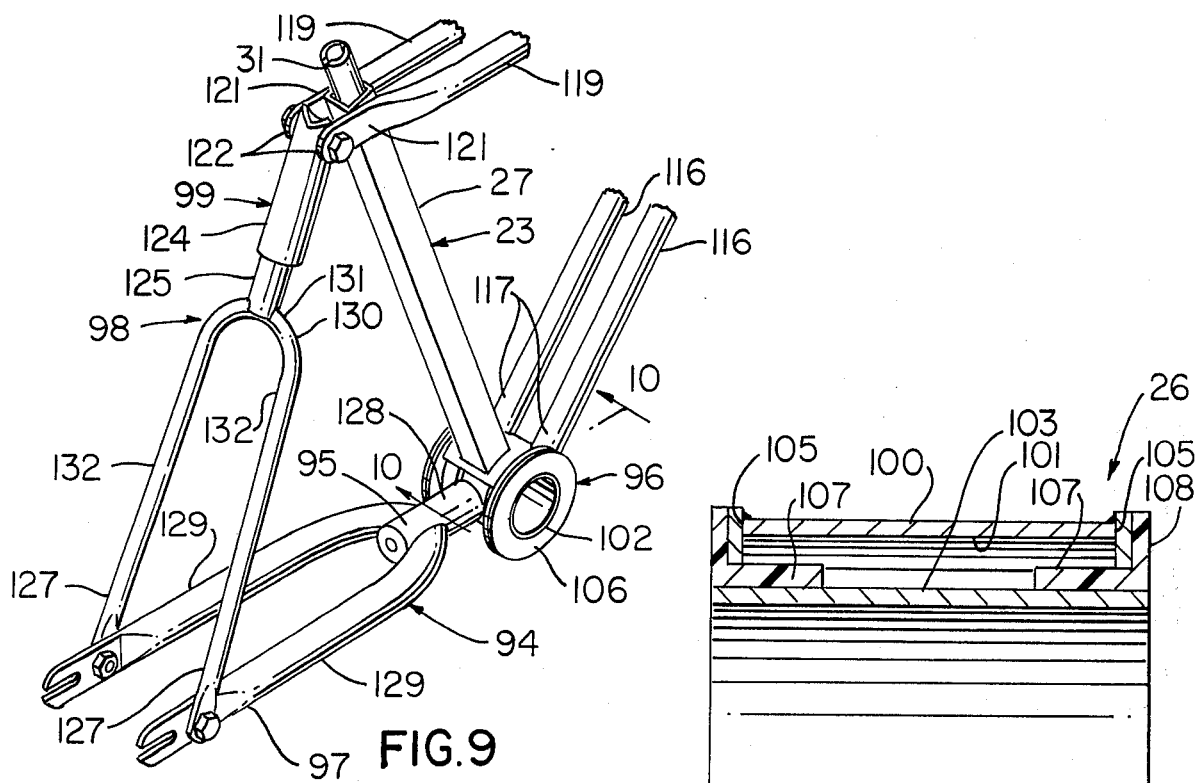
FIG. 9
FIG. 11
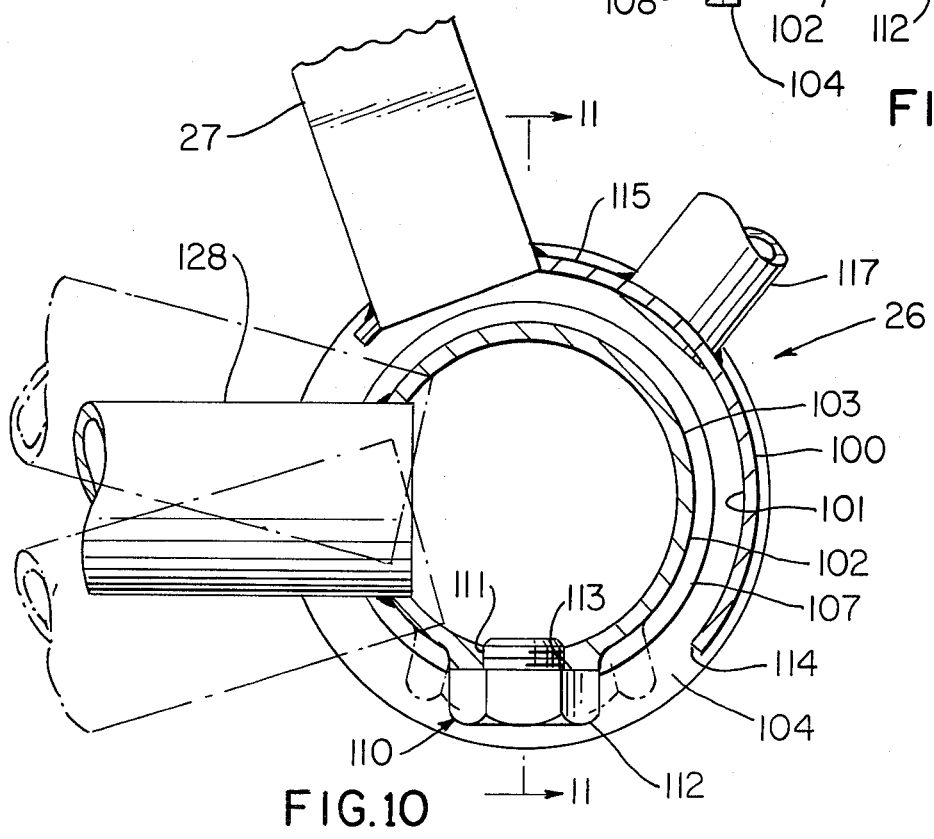
FIG. 10

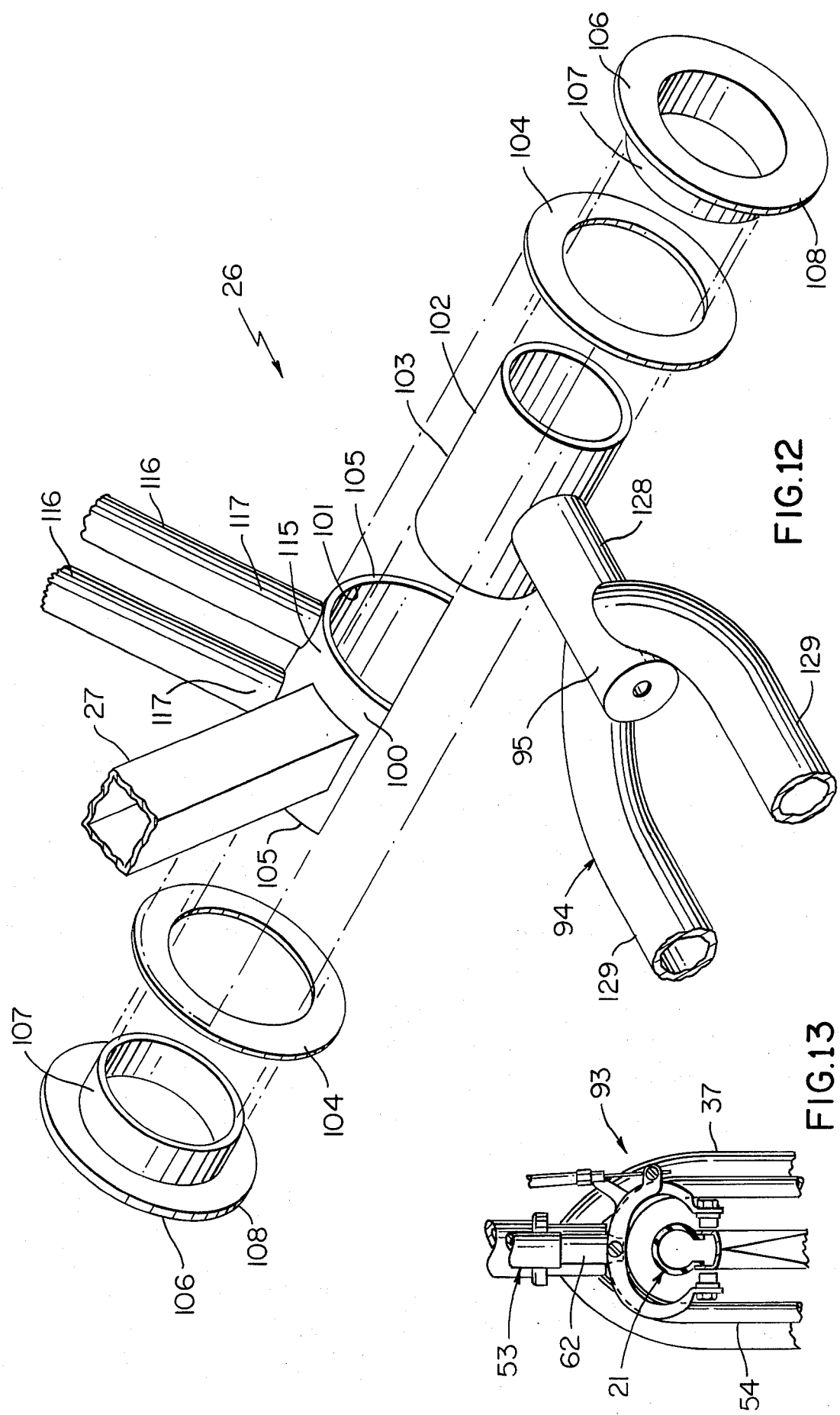

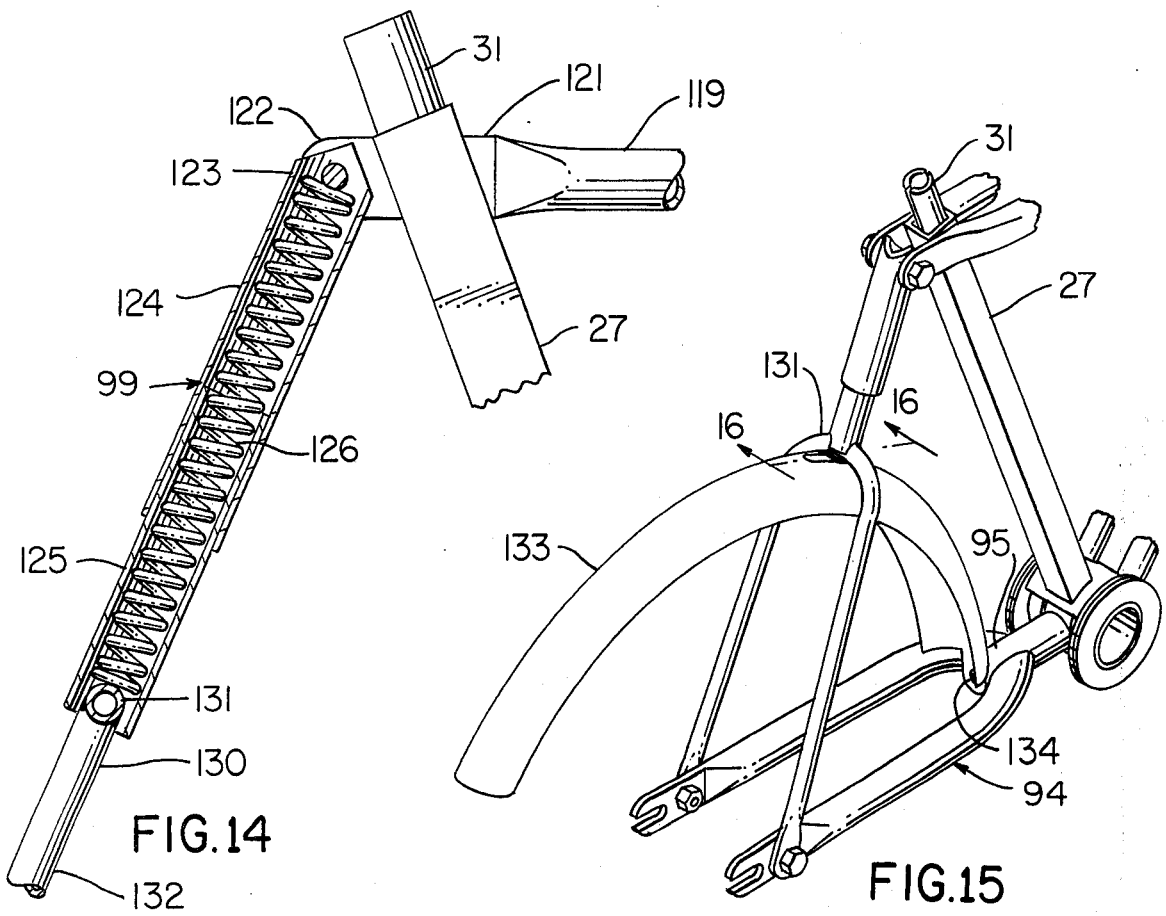
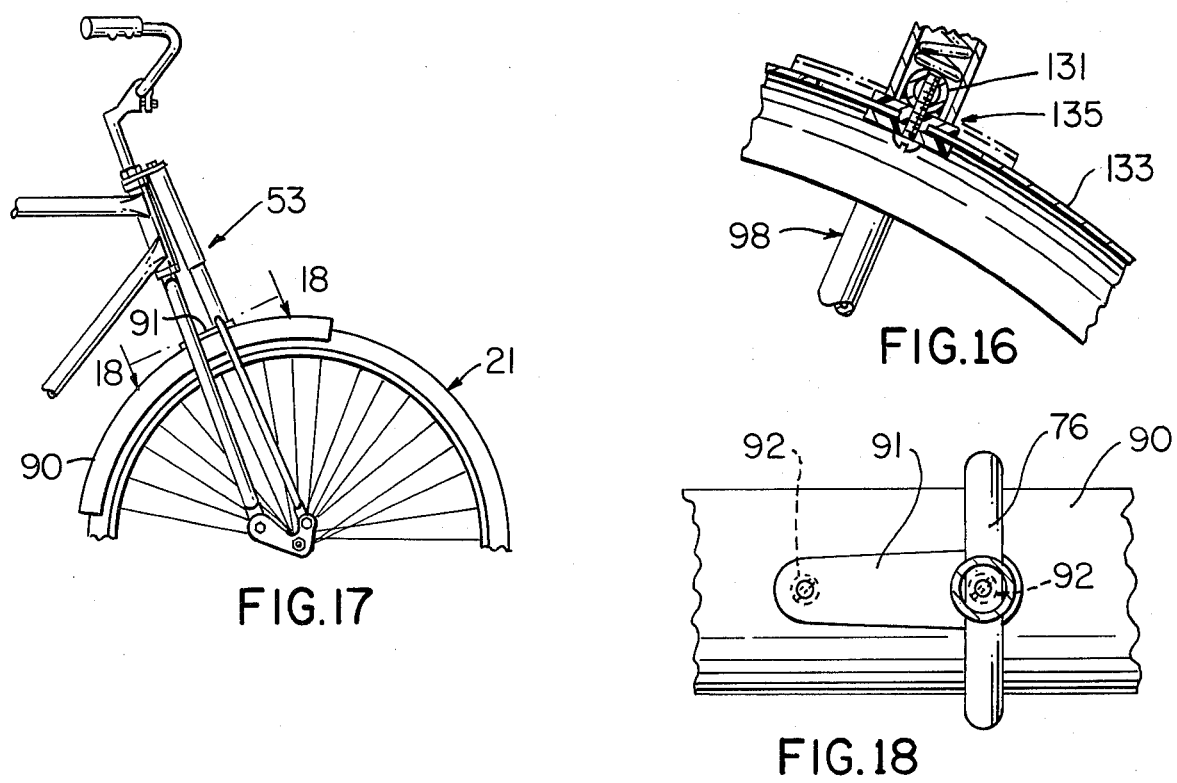

4,421,337

BICYCLE WITH RESILIENTLY YIELDABLE WHEEL SUPPORTS

BACKGROUND OF THE INVENTION

1. Field of the Invention

This invention relates to an improved bicycle and to a method of making such bicycle.

2. Description of the Prior Art

It is known in the art to provide a so-called velocipede or bicycle having shock absorbing means, generally comprising mechanical spring devices, associated with its front and/or rear wheels for the purpose of allowing same to be operated over rough terrain with minimum jolting of a rider, and as disclosed in the following United States Patents, for example:

U.S. Pat. Nos. 90,723; Re 12,437; 401,237; 443,266; 564,319; 578,614; 708,202; 902,920; 927,989; 1,834,308; 2,446,731; 2,687,898; 3,964,765; 3,982,770; 4,147,371.

SUMMARY OF THE INVENTION

The velocipedes or bicycles proposed heretofore are generally deficient because they have not been developed to the point of providing a smooth ride over rough terrain while still providing optimum riding stability yet with solid road handling and cornering characteristics. It is also apparent that the bicycles proposed heretofore which attempt to provide the above-mentiioned characteristics are basically special purpose vehicles which employ comparatively few standard bicycle components.

This invention provides an improved bicycle of the character mentioned which overcomes the above-mentioned deficiencies yet employs a maximum number of standard bicycle components in a number of bicycle sizes; and, the bicycle of this invention may employ frames of the so-called male or female types.

In accordance with one exemplary embodiment of this invention an improved bicycle is provided comprising, a front wheel, a rear wheel, a frame having a tubular forward portion, means mounting the frame on the wheels, a pedal assembly, and a support structure supporting the pedal assembly on the frame. The above-mentioned mounting means comprises, a front axle for rotatably supporting the front wheel, a first fork assembly having a first tubular member rotatably mounted within the tubular forward portion, a first pair of front wheel embracing legs extending from the lower end of the first tubular member, a pair of toggle links with each toggle link having an inner end pivotally fastened to the lower end portion of an associated one of the first pair of legs and an outer end having opening means for receiving an end portion of the front axle, a top plate detachably fastened to the first tubular member for rotation therewith, a second fork assembly having a second pair of front wheel embracing legs, fastening means for pivotally fastening an associated leg of the second fork assembly to an associated toggle link, and attaching means for attaching the front axle to the toggle links with the front axle having its opposite end portions disposed within the opening means.

In accordance with one embodiment of the improved bicycle of this invention the second fork assembly comprises a U-shaped single-piece component having a bight and a pair of parallel legs, a second tubular member fixed to and extending upwardly from the center of the bight, and yielding means operatively connected between the top plate and the second tubular member with the yielding means allowing large and abrupt vertical movements of the front wheel while maintaining the frame comparatively free of such movements.

In accordance with another embodiment of this invention an improved bicycle is provided which has a front wheel, a rear wheel, a frame, means mounting the frame on the wheels, a pedal assembly, a support structure supporting the pedal assembly on the frame, the mounting means comprising a first arm construction having an inner end pivotally supported adjacent the support structure and an outer end which has the rear wheel rotatably mounted thereto. A second arm construction is operatively connected between the outer end of the first arm construction and the frame and includes a yielding means that allows large and abrupt vertical movements of the rear wheel while maintaining the frame comparatively free of said movements. The support structure comprises a substantially semicylindrical housing fixed to the frame and having a concave inside surface. A substantially cylindrical sleeve is fixed to and defines the inner end of the first arm construction, the sleeve having a convex outside surface adapted to be disposed within the concave surface. A pair of flat annular rings are fixed to opposite end edges of the housing and a pair of retainers are disposed between the sleeve and the housing, the retainers serving the dual purpose of retaining the inner end of the first arm construction within the housing while allowing pivoting movements of the first arm construction and defining spaced bearings between the sleeve and housing.

Accordingly, it is an object of this invention to provide an improved bicycle of the character mentioned, Another object of this invention is to provide an improved method of making a bicycle of the character mentioned.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention in which:

FIG. 5 is a fragmentary view illustrating a first and second fork assembly of the bicycle of FIG. 1 and a pair of toggle links associated therewith;

FIG. 6 is a view taken essentially on the line 6—6 of FIG. 5;

FIG. 7 is a fragmentary exploded isometric view illustrating one side of the first and second fork assemblies, associated legs of the first and second fork assemblies and a pair of toggle links associated therewith;

FIG. 8 is a view particularly illustrating the forward fork assembly which has yielding means associated therewith;

FIG. 9 is a fragmentary isometric view particularly illustrating the improved support structure for the pedal assembly of the bicycle of FIG. 1 together with first and second arm constructions which allow cushioned movement of the rear wheel of such bicycle;

FIG. 10 is a view with parts in elevation and parts in cross section taken essentially on the line 10—10 of FIG. 9;

FIG. 11 is a cross-sectional view taken essentially on the line 11—11 of FIG. 10;

FIG. 12 is an exploded isometric view particularly illustrating detailed components of the support structure illustrated in FIGS. 10 and 11;

FIG. 13 illustrates a modification of a brake system which may be utilized with the bicycle of FIG. 1;

FIG. 14 is a fragmentary view with parts in elevation and parts in cross section and parts broken away particularly illustrating yielding means associated with the rear wheel of the bicycle of FIG. 1;

FIG. 15 is a modification illustrating a rear fender which may be utilized on the bicycle of FIG. 1;

FIG. 16 is a view taken essentially on the line 16—16 of FIG. 15;

FIG. 17 is a fragmentary view with parts particularly illustrating another modification illustrating a front fender assembly for the front wheel of the bicycle of FIG. 1 which may be utilized in the embodiment which utilizes a rear fender;

FIG. 18 is an enlarged view taken essentially on the line 18—18 of FIG. 17.

DETAILED DESCRIPTION

Figure 1:
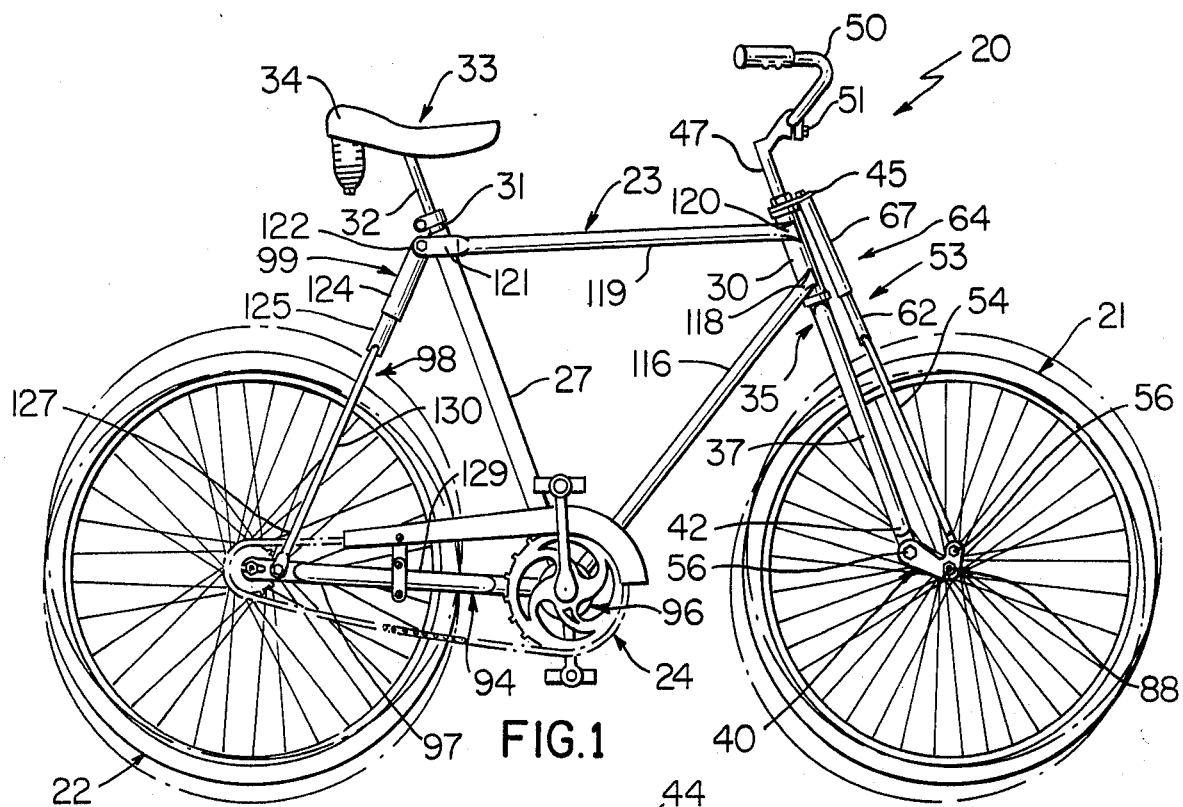
FIG. 1 is a side elevation illustrating one exemplary embodiment of the bicycle of this invention.

Reference is now made to FIG. 1 of the drawings which illustrates one exemplary embodiment of the bicycle of this invention which is designated generally by the reference numeral 20.

The bicycle 20 has a front wheel 21, a rear wheel 22, a frame 23 and means mounting the frame on the wheels, such mounting means being described in more detail subsequently. The bicycle also has a pedal assembly which is designated generally by the reference numeral 24 and a support structure which is designated generally by the reference numeral 26 in FIG. 12.

The frame 23 is of roughly quadrilateral outline and is comprised of a substantially vertically disposed tubular column 27 of roughly square cross-sectional configuration at the rear portion thereof and a tubular forward portion 30 of substantially right circular cylindrical configuration. The column 27 has a right circular cylindrical tube 31 fixed therewithin and the tube 31 extends from the top portion thereof. The tube 31 is adapted to receive a seat post 32 of a seat assembly 33 which includes the usual seat 34.

The mounting means previously mentioned for mounting the frame on the wheels comprises a first fork assembly 35 which has a first tubular upper member 36 rotatably mounted within the tubular forward portion 30. The fork assembly 35 has a first pair of front wheel embracing legs each designated by the same reference numeral 37 extending from the lower end of the first tubular member 36. As seen in FIG. 7 a pair of toggle links are each designated by the same reference numeral 40 and each link 40 has an inner end 41 pivotally fastened by fastening means to the lower end portion 42 of an associated one of the pair of parallel legs 37 and an outer end portion 43 provided with an axle receiving opening means in the form of a substantially vertically disposed slot 44.

The bicycle 20 also has a top plate top member which will be referred to as a top plate 45 detachably fixed to the tubular forward portion 30 of the frame 23 by means of a threaded nut 46 which is threadedly fastened in position to a threaded upper portion of the tubular forward portion. The nut 46 has an opening therethrough and is particularly adapted to receive a handle bar gooseneck 47 which is suitably fixed in position within the tubular upper portion 30 in any suitable manner known in the art, the gooseneck 47 having a handlebar 50 suitably fixed thereto by means of a threaded bolt 51 as is known in the art. The handlebar gooseneck 47 operating to steer the bicycle by turning the front wheel 21 in a manner well known in the art.

The bicycle 20 also has a second fork assembly which is designated generally by the reference numeral 53. The second fork assembly 53 has a second pair of front wheel embracing legs each designated by the same reference numeral 54 and a pair of fasteners each pivotally fastening a leg 54 of the second fork assembly 53 to an associated toggle link 40. Each fastener in this example of the invention is the same as the fastening means for the end portions 42 and consists of a threaded bolt 56 and an associated nut 57, the bolt 56 extending through an opening 60 in each link 40 and an associated opening 61 in the lower portion 63 of a leg 54 such that upon fastening the nut 57 in position on the bolt 56, a pair of links 40 are fastened to an associated leg 54 of the second fork assembly 53 in a pivoted manner.

Figures 2, 3, 4:
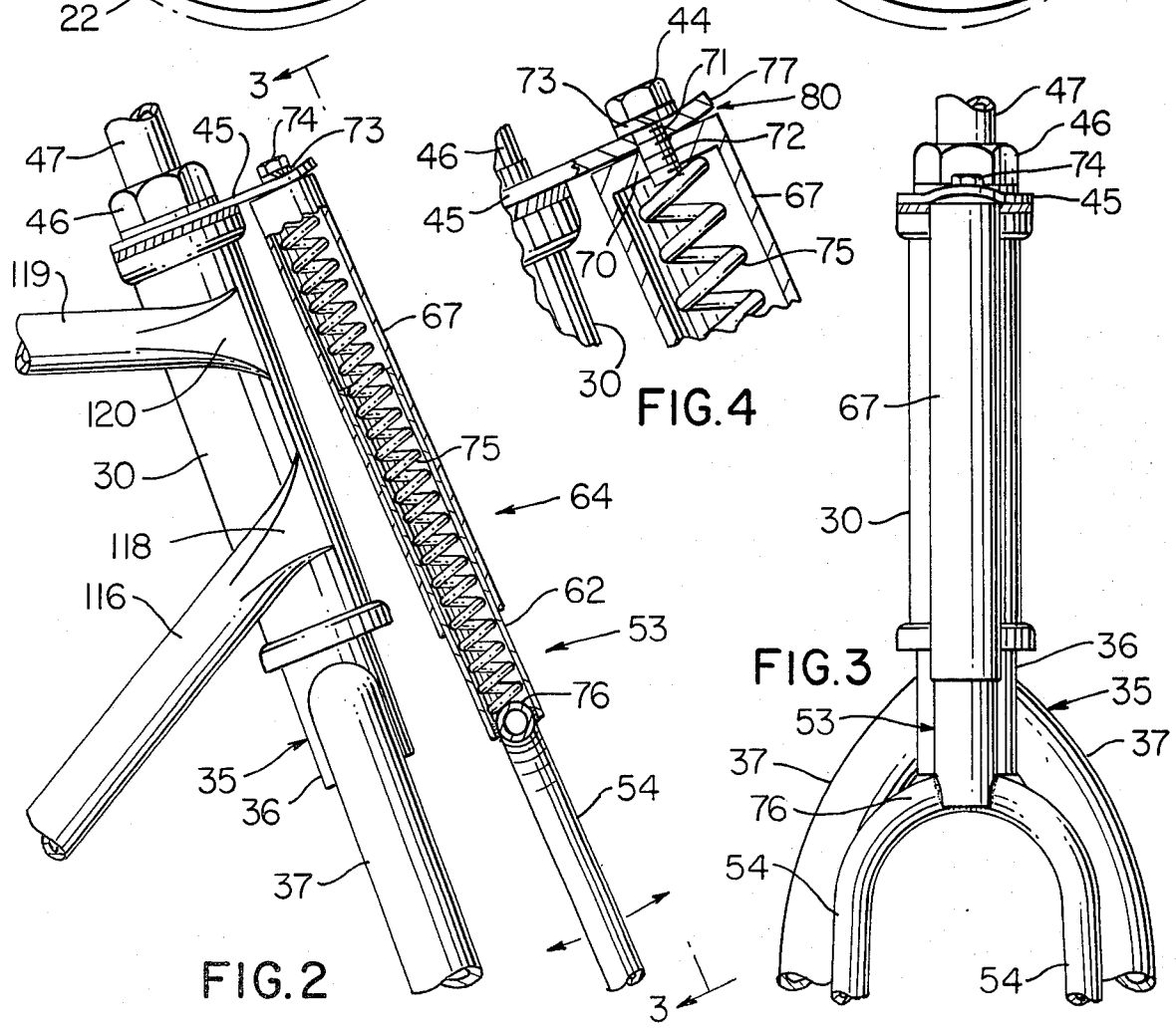
FIG. 2 is a fragmentary view with parts in elevation, parts in cross section and parts broken away illustrating a pair of fork assemblies at the forward portion of the bicycle of FIG. 1.
FIG. 3 is a view taken essentially on the line 3—3 of FIG. 2.
FIG. 4 is an enlarged fragmentary view with parts in cross section particularly illustrating a detail of a top plate associated with one of the fork constructions as ilustrated in FIG. 2.

As will be readily apparent from FIGS. 2 and 3 of the drawings, the second fork assembly has a second tubular upper member 62 extending from the upper end portions of its associated legs 54. Yielding means, designated generally by the reference numeral 64, is operatively connected between the top plate 45 and the second tubular upper member 62.

Once the bicycle 20 is assembled with the wheel 21, the yielding means 64 allows large and abrupt vertical movements of the front wheel 21 while allowing the frame 23 to remain comparatively free of such movements and provide an improved cushioning action for the front wheel of the bicycle 20.

The yielding means 64 comprises another open ended tubular member 67 which has an integral wall 70 defining its closed end. The member 67 is detachably fastened to the top plate 45 by a threaded bolt which extends loosely through an opening 71 in the plate 45 and is threadedly received within a threaded opening 72 in the wall 70. A washer 73 made of an antifriction material is disposed between the head 74 of the threaded nut and the top surface of the top plate 45.

It will also be seen that the tubular member 67 is dimensioned such that it is adapted to be disposed in telescoped relation around the tubular member 62, and as seen in FIG. 2 the yielding means 64 comprises a mechanical compression spring 75 which acts between the inside surface of the wall 70 and a bight 76 comprising the second fork assembly 53. The spring 75 is a component of the yielding means 64 which allows the large and abrupt vertical movements of the front wheel 21 and provides a cushioning action.

As will be readily apparent from FIG. 4 of the drawings, the top plate 45 has an upwardly curved outer portion 77 which is particularly adapted to allow movements of the upper part of the second fork assembly 53 and in particular allow movements of the tubular member 67 with its wall 70 in a non-binding manner and yet without requiring the provision of an additional link or pivoting point. In essence, it will be seen that a pivoting action for the second or cushioning fork assembly 53 is provided by the threaded bolt 56 at one end and essentially by pivoting about the nut or screw at the opposite end. Thus, it will be appreciated that the curved outer portion 77 allows the wheels 21 to move upwardly in a non-binding manner due to the space provided at 80.

As will be readily apparent from FIG. 7 of the drawings, each wheel embracing leg 37 of the first fork assembly has an arcuate cutout 81 therein defining a stop ledge 82 at the lower end thereof. It will also be seen that at least one of the toggle links 40 associated with each leg 37 and shown as the right link in FIG. 7 has a lug-like projection 84 extending therefrom and in this example as an integral part thereof. The projection 84 is particularly adapted to be received within the cutout 81 at the lower end of an associated leg 37 and once the bicycle is raised so that the wheel 21 is lifted off of a wheel supporting surface such as the ground, the wheel 21 tends to remain on the ground thereby allowing the links 40 associated with each leg 37 to rotate clockwise as viewed in FIG. 1, i.e., toward the ground and this rotation continues until the projection 84 engages the stop ledge 82. Once the projection 84 engages the stop ledge 82, further rotation of the associated link 40 is prevented whereby with this arrangement there is assurance that the front end of the bicycle 20 cannot be lifted so that the tubular upper member 62 is removed out of telescoping relation from within the tubular member 67. This serves as a safety feature assuring that the yielding means 64 of the bicycle is not inadvertently disassembled by lifting the front end of the bicycle upon grasping the frame 23 thereof.

As will be readily apparent from FIG. 7 of the drawings, the bicycle 20 has unique safety means in connection with the front wheel 21 and such safety means consists of a disc-like deformation 85 in each link 40. Each disc-like deformation defines a recess 86 and a substantially annular shoulder 87 which is particularly adapted to receive a nut 88 associated with the front axle 89 of the bicycle 20 as illustrated in FIG. 6. Thus, it can be seen that there are two pairs of links 40 for greater strength and safety, one pair of links 40 being disposed at opposite sides or end portions of the axle 89 and the other pair of links 40 also being disposed at opposite sides or end portions of the axle 89 whereby the nuts 88 cooperate with the links 40 to hold the wheel 21 to the frame means 23 as illustrated with the nuts 88 and like portions of the axle 89 being respectively received in the recesses 86 of the links 40 and engaging the shoulders 87 thereof to hold the front wheel 21 to the frame 23 as illustrated in FIG. 6.

If desired, a fender 90 for the front wheel 21 can be provided as illustrated in FIG. 17 wherein a bracket 91 for supporting the fender 90 is fixed to the bight 76 by at least one threaded screw 92 detachably fastening the fender 90 to the bracket 91.

Also, conventional brake means, such as is generally indicated by the reference numeral 93 in FIG. 13 can be provided for the front wheel 21 and/or rear wheel 22 of the bicycle 20.

As illustrated in FIGS. 9–12, the rear wheel 22 of the bicycle 20 is mounted by mounting means to the frame 23, the mounting means comprising a first arm construction 94 having an inner end 95 pivotally supported adjacent support structure 96 for the pedal assembly 24 and an outer end 97 which has the rear wheel 22 rotatably mounted thereto. A secod arm construction 98 is operatively connected between the outer end 97 of the first arm construction 94 and the frame 23. Yielding means 99 comprises part of the second arm construction 98 as illustrated in FIG. 14, the means 99 allowing large and abrupt vertical movements of the rear wheel 22 while maintaining the frame 23 comparatively free of the movements. The support structure 96 comprises a substantially semicylindrical housing 100 fixed to the frame 23 and has a concave inside surface 101. A substantially cylindrical sleeve 102 is fixed to and defines the inner end 95 of the first arm construction 94. The sleeve 102 has a convex outside surface 103 adapted to be disposed within the concave surface 101 as illustrated in FIGS. 10 and 11. A pair of flat annular rings 104 are fixed to opposite end edges 105 of the housing 100, such as by welding, and a pair of retainers 106 are disposed between the sleeve 102 and the housing 100. The retainers 106 serve the dual purpose of retaining the inner end 95 of the first arm construction 94 within the housing 100 while allowing pivoting movements of the first arm construction 94 and define spaced bearings between the sleeve 102 and the housing 100 for this purpose.

Each of the retainers 106 has a right circular cylindrical portion 107 adjoined by an annular flange 108, each right circular cylindrical portion 107 being disposed in sandwiched relation between associated end portions of the housing 100 and sleeve 102 and serving as a sleeve bearing therebetween while preventing movement of the sleeve 102 away from the housing 100. Each annular flange 108 is fastened to an associated ring 104 in any suitable manner, such as by an adhesive means 109.

The sleeve 102 has a given axial length and the retainers 106 are substantially identical with each right circular cylindrical portion 107 thereof having an axial length which is less than half of the given axial length of the sleeve 102.

Each of the retainers 106 is made of polymeric material such as rubber or synthetic plastic and can comprise a high strength synthetic plastic material with its right circular cylindrical portion 107 and flange 108 being a single-piece structure. For example, the synthetic plastic material can be a polyamide.

A stop 110 is detachably fixed to the sleeve 102, the stop 110 serving to limit pivoting movements of the first arm construction 94 away from the frame 23, the stop 110 preventing untelescoping of the yielding means 99 in a manner similar to stop 82 previously described.

In particular, the stop 110 is a threaded metal screw having a threaded portion 111 and a comparatively thick head 112, the threaded portion 111 being threaded within a threaded opening 113 in the sleeve 102. The head 112 is adapted to engage a side edge 114 of the semicylindrical housing 100 to limit the pivoting movements of the first arm construction 94 away from the frame 23.

The frame 23 has a roughly quadrilateral outline comprised of the substantially vertically disposed tubular column 27 of roughly square cross-sectional configuration fixed to the top surface 115 of the semicylindrical housing 100, the column 27 having the right circular cylindrical tube 31 fixed therewithin and extending from the top portion thereof. The tube 31 is adapted to receive the seat post 32 of the seat assembly 34 of the bicycle 20.

The frame 23 further comprises the tubular forward portion 30 and a pair of upwardly inclined bars 116 having opposite ends 117 and 118 fixed between the semicylindrical housing 100 and the lower portion of the tubular forward portion 30.

A pair of upper bars 119 of the frame 23 have forward ends 120 fixed to the tubular forward portion 30 and have flattened opposite end portions 121 fixed to diametrically opposite sides of the square tubular column 27 with flattened parts 122 thereof extending rearwardly. The flattened end portions 121 define a controlled space therebetween with the controlled space being particularly adapted to receive an upper end portion 123 of the yielding means 99 therebetween. The flattened end portions 121 are welded to the upper part of the vertically disposed column 27.

The yielding means 99 comprises a first open-ended tubular housing 124 having the top end portion 123 pivotally supported between the flattened end portions 122 as illustrated in FIG. 14. A second open-ended tubular housing 125 is defined as an integral part of the second arm construction 98, the second open-ended tubular housing 125 being disposed in telescoped relation within a lower end portion of the first open-ended tubular housing 124 as illustrated in FIG. 14. Spring means 126 is disposed within the first and second tubular housings 124 and 125, the spring means 126 serving to urge a lower end portion 127 of the second arm construction 98 away from the frame 23 while pivoting the first arm construction 94 about its cylindrical sleeve 102 to allow the vertical movements of the rear wheel 22 while maintaining the frame 23 comparatively free of the movements.

The first arm construction 94 has an innermost tubular part 128 fixed perpendicular to the axis of its sleeve 102 and a first pair of parallel arms 129 extending from the outer end of the innermost tubular part 128, the first pair of arms 129 being disposed on opposite sides of the rear wheel 22 and being detachably fastened to an axle for the rear wheel 22 in a manner conventional in the art.

The second arm construction 98 comprises a U-shaped single-piece component 130 having a bight 131 and a second pair of parallel arms 132, the parallel arms 132 of the second pair being disposed on opposite sides of the rear wheel 22 each with an outer end 127 detachably fastened on an associated arm 129 of the first pair as illustrated in FIG. 9. The first open-ended tubular housing 125 is fixed to the bight 131 and extends therefrom.

If desired, the bicycle 20 can have a rear fender 133 for the rear wheel 22 as illustrated in FIGS. 15 and 16, the rear fender 133 being fastened at 134 to the outer end of the innermost tubular part 95 of the first arm construction 94 and being slideably supported against the bight 131 of the second arm construction 98 by suitable slide means 135. If desired, the slide means 135 can have a cover, shown in phantom in FIG. 16, to close the opening in the rear fender 133 while permitting movement therebetween.

While the pedal assembly 24 can be any suitable pedal assembly known in the art, it is to be understood that the bicycle 20 could be a single speed or multiple speed bicycle with coaster brakes or hub brakes as desired.

Also, while the frame 23 of the bicycle 20 can be formed of any suitable material to provide standard or custom frame sizes, the frame 23 can be formed of 1020 carbon steel throughout.

Thus, it can be seen that an improved bicycle is made by the method of this invention in the above manner to operate in a conventional manner while providing a comfortable and stable handling range through the unique suspension system thereof as previously described. For example, by merely substituting stronger or weaker compression springs 85 and 126 for the yielding means 64 and 99, different degrees of riding characteristics can be provided for the bicycle 20 of this invention without requiring a change of the frame 23 thereof.

Accordingly, this invention not only provides an improved bicycle, but also this invention provides a method of making such a bicycle or the like.

While the forms and method of this invention now preferred have been illustrated and described as required by the Patent Statute, it is to be understood that other forms and method steps can be utilized and still fall within the scope of the appended claims.

What is claimed is:

1. In a bicycle comprising; a front wheel; a rear wheel; a frame having a tubular forward portion; means mounting said frame on said wheels; a pedal assembly; a support structure supporting said pedal assembly on said frame; said mounting means comprising, a front axle for rotatably supporting said front wheel, a first fork assembly having a first tubular member rotatably mounted within said tubular forward portion, a first pair of front wheel embracing legs extending from the lower end of said first tubular member, a first pair of toggle links disposed on opposite end portions of said front axle, each toggle link of said first pair of toggle links having an inner end pivotally fastened to the lower end portion of an associated one of said first pair of legs and an outer end having opening means for receiving an associated end portion of said front axle, a top plate detachably fastened to said first tubular member for rotation therewith, a second fork assembly having a second pair of front wheel embracing legs, fastening means pivotally fastening an associated leg of said second fork assembly to an associated toggle link of said first pair of toggle links, attaching means for attaching said front axle to said first pair of toggle links with said front axle having its opposite end portions disposed within said opening means, said second fork assembly comprising a U-shaped singlepiece component having a bight and a pair of parallel legs, a second tubular member fixed to and extending upwardly from the center of said bight, and yielding means operatively connected between said top plate and said second tubular member, said yielding means allowing large and abrupt vertical movements of said front wheel while maintaining said frame comparatively free of said movements; the improvement comprising a second pair of toggle links also disposed on opposite end portions of said front axle, each toggle link of said second pair cooperating with an associated toggle link of said first pair, each toggle link of said second pair also having an inner end pivotally fastened to the lower end portion of an associated one of said first pair of legs and an outer end having opening means for receiving an associated end portion of said front axle, said fastening means pivotally fastening an associated leg of said second fork assembly to an associated toggle link of said first pair of toggle links also serving to pivotally fasten the associated leg of said second fork assembly to an associated toggle link of said second pair of toggle links, and said attaching means also serving to attach said front axle to said second pair of toggle links with said front axle also having its opposite end portions disposed within said opening means in said toggle links of said second pair.

2. A bicycle as set forth in claim 1 and further comprising a cutout in the lower end of at least one of said first pair of wheel embracing legs of said first fork assembly, said cutout defining a stop ledge, and a projection extending from one of two of the said toggle links associated with said one leg, said projection being disposed intermediate said two toggle links and within said cutout, said projection being adapted to engage said stop ledge toprevent movement of said front wheel away from said top plate and frame in the event said frame is lifted to move said front wheel away from a supporting surface therefor, and said two toggle links serving to isolate said stop ledge and projection.

3. A bicycle as set forth in claim 2 in which each of said toggle links has a disc-like deformation therein defining a recess and a surrounding annular shoulder and each of said annular shoulders being adapted to receive a portion of said attaching means thereagainst, said annular shoulders serving as safety means preventing vertical movement of said front axle from within said opening means in the event of partial detachment of said attaching means.

4. A bicycle as set forth in claim 3 in which said yielding means operatively connected between said top plate and said second tubular upper member comprises a mechanical compression spring; said second tubular member has an upwardly facing open end and a given outside diameter and said yielding means comprises; a third tubular member which has a downwardly facing open end, a wall defining a top closed end, and an inside diameter which is larger than said given outside diameter; said third tubular member being adapted to be disposed in telescoped relation around said second tubular member with said compression spring housed within said second and third tubular members; and means pivotally supporting said third tubular member by pivotally supporting said wall thereof to said top plate.

5. A bicycle as set forth in claim 4 in which said compression spring has opposite ends acting between said wall and said bight.

6. A bicycle as set forth in claim 5 in which said top plate has an upwardly curved outer portion which is particularly adapted to allow pivoting movements of said wall of said third tubular member and thus said second tubular member and said second fork assembly in a non-binding manner during said movements of said front wheel.

7. A bicycle as set forth in claim 6 and further comprising a fender for said front wheel, a bracket for supporting said fender, means fixing said bracket to said bight, and at least one threaded screw detachably fastening said fender to said bracket.

8. A bicycle as set forth in claim 6 and further comprising a handlebar assembly detachably fixed to said first tubular member to enable partial rotary movements and steering of said first tubular member and hence said front wheel.

9. In a bicycle having a front wheel; a rear wheel; a frame; means mounting said frame on said wheels; a pedal assembly; a support structure supporting said pedal assembly on said frame; said mounting means comprising, a first arm construction having an inner end pivotally supported adjacent said support structure and an outer end which has said rear wheel rotatably mounted thereto, a second arm construction operatively connected between said outer end of said first arm construction and said frame, and yielding means comprising said second arm construction, said yielding means allowing large and abrupt vertical movements of said rear wheel while maintaining said frame comparatively free of said movements; the improvement in which said support structure comprises, a substantially semicylindrical housing fixed to said frame and having a concave inside surface, a substantially cylindrical sleeve fixed to and defining said inner end of said first arm construction, said sleeve having a convex outside surface adapted to be disposed within said concave surface, a pair of flat annular rings fixed to opposite end edges of said housing, and a pair of retainers disposed concentrically between said sleeve and said housing, said retainers serving the dual purpose of retaining said inner end of said first arm construction within said housing while allowing pivoting movements of said first arm construction and defining spaced bearings physically interposed between said sleeve and housing.

10. A bicycle as set forth in claim 9 in which each of said retainers has a right circular cylindrical portion adjoined by an annular flange, each right circular cylindrical portion being disposed in sandwiched relation between associated end portions of said housing and sleeve and serving as a sleeve bearing while preventing movement of said sleeve away from said housing, and each annular flange being fastened to an associated one of said rings.

11. A bicycle as set forth in claim 10 in which said sleeve has a given axial length, said retainers are substantially identical, and each right circular cylindrical portion of each retainer has an axial length which is less than half of said given axial length.

12. A bicycle as set forth in claim 11 in which each of said retainers is made of a high strength synthetic plastic material with its right circular cylindrical portion and flange as a single-piece structure.

13. A bicycle as set forth in claim 12 in which said synthetic plastic material is a polyamide.

14. A bicycle as set forth in claim 12 and further comprising weld means fixing each of said rings to an associated end edge of said housing, and adhesive means fixing said flange portion of each retainer against an associated one of said rings.

15. A bicycle as set forth in claim 11 in which said yielding means comprises a first open-ended tubular housing having a top end portion pivotally supported between said flattened end portions, a second open-ended tubular housing defined as an integral part of said second arm construction, said second open-ended tubular housing being disposed in telescoped relation without a lower end portion of said first open-ended tubular housing, and spring means disposed within said first and second tubular housings, said spring means serving to urge the lower end portion of said second arm construction away from said frame while pivoting said first arm contruction about its cylindrical sleeve to allow said vertical movements of said rear wheel while maintaining said frame comparatively free of said movements.

16. A bicycle as set forth in claim 15 in which said spring means comprises a compression spring.

17. A bicycle as set forth in claim 16 in which said first arm construction has an innermost tubular part fixed perpendicular to the axis of its sleeve and a first pair of parallel arms extending from the outer end of said innermost tubular part, said first pair of arms being disposed on opposite sides of said rear wheel and being detachably fastened to an axle for said rear wheel.

18. A bicycle as set forth in claim 17 in which said second arm construction comprises a U-shaped singlepiece component having a bight and a second pair of parallel arms, said parallel arms of said second pair being disposed on opposite sides of said rear wheel each with an outer end pivotally fastened to an associated arm of said first pair, and said first open-ended tubular housing being fixed to said bight and extending therefrom.

19. A bicycle as set forth in claim 18 and further comprising a rear fender for said rear wheel, said rear fender being fastened to the outer end of said innermost tubular part of said first arm construction and being slideably supported against the bight of said second arm construction.

20. A bicycle as set forth in claim 9 in which said mounting means further comprises, a front axle for rotatably supporting said front wheel, a first fork assembly having a first tubular upper member rotatably mounted within said tubular forward portion, a first pair of front wheel embracing legs extending from the lower end of said first tubular member, a first pair of toggle links disposed on opposite end portions of said front axle, each toggle link of said first pair of toggle links having an inner and pivotally fastened to the lower end portion of an associated one of said first pair of legs and an outer end having opening means for receiving an associated end portion of said front axle, a top plate detachably fixed to said tubular forward portion, a second fork assembly having a second pair of front wheel embracing legs, fastening means pivotally fastening an associated leg of said second fork assembly to an associated toggle link of said first pair of toggle links, attaching means for attaching said front axle to said first pair of toggle links with said front axle having its opposite end portions disposed within said opening means, said second fork assembly comprising a U-shaped singlepiece component having a bight and a pair of parallel legs, a second tubular member fixed to and extending upwardly from the center of said bight, and second yielding means operatively connected between said top plate and said second tubular member, said second yielding means allowing large and abrupt vertical movements of said front wheel while maintaining said frame comparatively free of said movements.

21. A bicycle as set forth in claim 20 and further comprising a second pair of toggle links also disposed on opposite end portions of said front axle, each toggle link of said second pair cooperating with an associated toggle link of said first pair, each toggle link of said second pair also having an inner end pivotally fastened to the lower end portion of an associated one of said first pair of legs and an outer end having opening means for receiving an associated end portion of said front axle, said fastening means pivotally fastening an associated leg of said second fork assembly to an associated toggle link of said first pair of toggle links also serving to pivotally fasten the associated leg of said second fork assembly to an associated toggle link of said second pair of toggle links, and said attaching means also serving to attach said front axle to said second pair of toggle links with said front axle also having its opposite end portions disposed within said opening means in said toggle links of said second pair, said first and second pair of toggle links cooperating with said attaching means to support said front axle in position with greater strength and safety.

22. In a bicycle having a front wheel; a rear wheel; a frame; means mounting said frame on said wheels; a pedal assembly; a support structure supporting said pedal assembly on said frame; said mounting means comprising, a first arm construction having an inner end pivotally supported adjacent said support structure and an outer end which has said rear wheel rotatably mounted thereto, a second arm construction operatively connected between said outer end of said first arm construction and said frame, and yielding means comprising said second arm construction, said yielding means allowing large and abrupt vertical movements of said rear wheel while maintaining said frame comparatively free of said movements; the improvement in which said support structure comprises, a substantially semicylindrical housing fixed to said frame and having a concave inside surface, a substantially cylindrical sleeve fixed to and defining said inner end of said first arm construction, said sleeve having a convex outside surface adapted to be disposed within said concave surface, a pair of flat annular rings fixed to opposite end edges of said housing, a pair of retainers disposed concentrically between said sleeve and said housing, said retainers serving the dual purpose of retaining said inner end of said first arm construction within said housing while allowing pivoting movements of said first arm construction and defining spaced bearings physically interposed between said sleeve and housing, each of said retainers having a right circular cylindrical portion adjoined by an annular flange, each right circular cylindrical portion being disposed in sandwiched relation between associated end portions of said housing and sleeve and serving as a sleeve bearing while preventing movement of said sleeve away from said housing, each annular flange being fastened to an associated one of said rings, said sleeve having a given axial length with said retainers being substantially identical, each right circular cylindrical portion of each retainer having an axial length which is less than half of said given axial length, each of said retainers being made of a high strength synthetic plastic material with its right circular cylindrical portion and flange as a single-piece structure, and a stop detachably fixed to said sleeve, said stop serving to limit pivoting movements of said first arm construction away from said frame.

23. A bicycle as set forth in claim 22 in which said stop is a threaded metal screw having a threaded portion and a comparatively thick head, said threaded portion being threaded within a threaded opening in said sleeve, and said head being adapted to engage a side edge of said semicylindrical housing to limit said pivoting movements of said first arm construction away from said frame.

24. A bicycle as set forth in claim 22 in which said frame has a roughly quadrilateral outline comprised of a substantially vertically disposed tubular column of roughly square cross-sectional configuration fixed to the top surface of said semicylindrical housing, said column having a right circular cylindrical tube fixed therewithin and extending from the top portion thereof, said tube being adapted to receive a seat post comprising a seat assembly of said bicycle.

25. A bicycle as set forth in claim 20 in which said frame further comprises a tubular forward portion, at least one upwardly inclined bar having opposite ends fixed between said semicylindrical housing and the lower portion of said tubular forward portion.

26. A bicycle as set forth in claim 25 and further comprising a pair of upper bars having forward ends fixed to said tubular forward portion and having flattened opposite end portions fixed diametrically opposite sides of said square tubular column with flattened parts thereof extending rearwardly, said flattened end portions defining a controlled space therebetween, and said controlled space being particularly adapted to receive an upper end portion of said yielding means therebetween.

27. A bicycle as set forth in claim 26 in which said flattened end portions are welded to the upper part of said vertically disposed column.

* * * * *